Feb. 21, 1956  G. H. MULLER  2,735,502
HYDRAULIC POWER STEERING WITH VALVED PISTON
Filed Oct. 17, 1952  2 Sheets-Sheet 1

G. H. MULLER
INVENTOR.

BY E. C. McRae
J. R. Faulkner
G. H. Oster

ATTORNEYS

Feb. 21, 1956
G. H. MULLER
2,735,502
HYDRAULIC POWER STEERING WITH VALVED PISTON
Filed Oct. 17, 1952
2 Sheets-Sheet 2
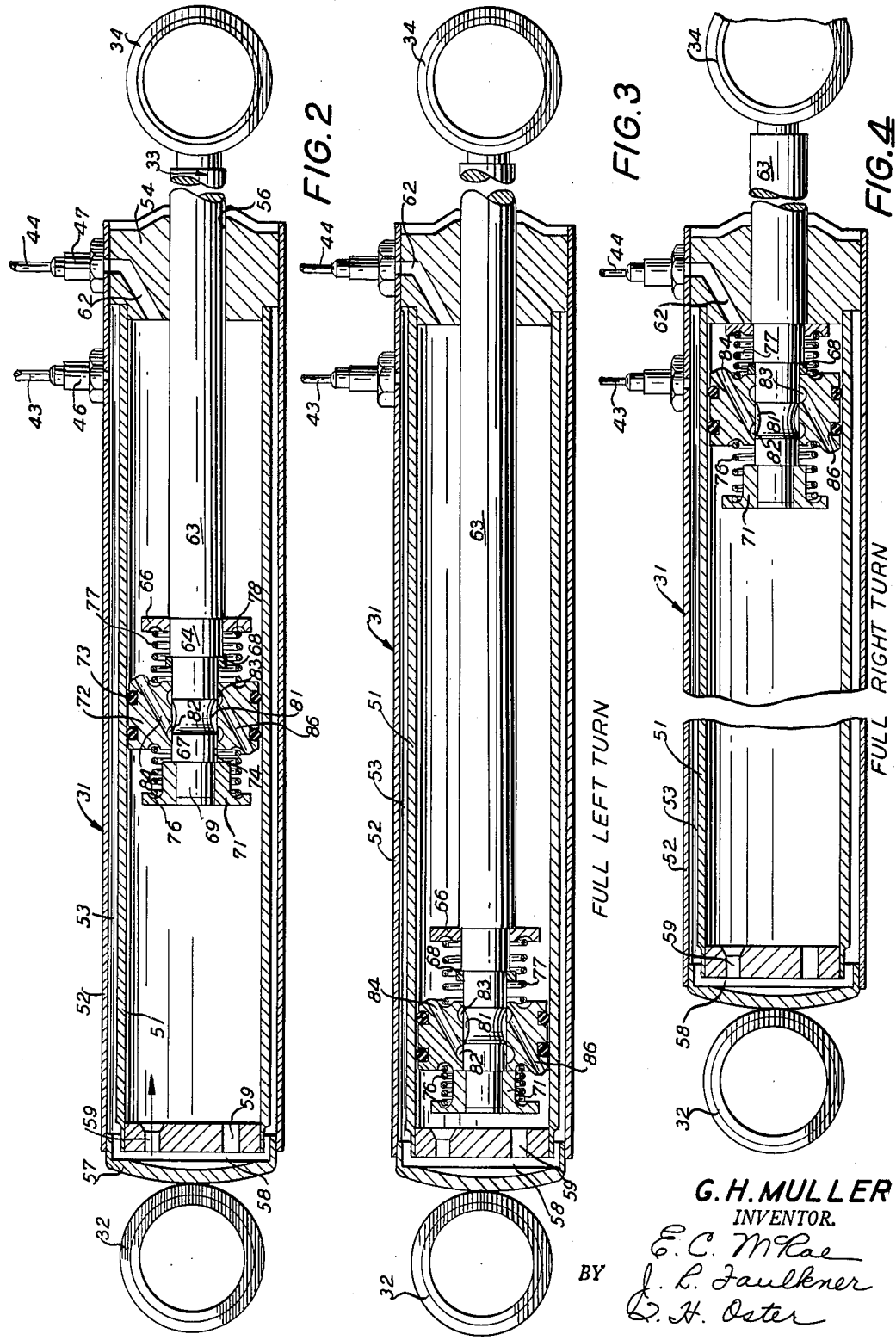
G. H. MULLER
INVENTOR.
BY E. C. McRae
J. L. Faulkner
G. H. Oster
ATTORNEYS United States Patent Office 2,735,502
Patented Feb. 21, 1956

2,735,502

HYDRAULIC POWER STEERING WITH VALVED PISTON

George H. Muller, Northville, Mich., assignor to Ford Motor Company, Dearborn, Mich., a corporation of Delaware Application October 17, 1952, Serial No. 315,353

5 Claims. (Cl. 180—79.2)

This invention relates generally to power steering mechanism, and has particular reference to a steering mechanism in which the manual steering effort is augmented by a hydraulic power unit whenever the manual steering effort exceeds a predetermined amount.

The present invention is particularly adapted for use in connection with power steering mechanism of the booster type in which a cylinder and piston assembly is connected between a stationary frame member and a movable steering member forming part of the steering linkage, although it may also be used in connection with other types of power steering systems. With the booster cylinder located adjacent the steering linkage it is in an exposed position and is consequently subject to possible damage from the impact of foreign materials or from other causes. Although normally the vehicle can be steered manually in the event of failure of the hydraulic power mechanism, it is quite possible that with the cylinder located in this exposed position the injury to the cylinder which impairs the operation of the hydraulic power unit may also interfere with the proper operation of the manual steering system. For example, a break or leak in the cylinder wall, while rendering the power steering inoperative, normally would not interfere with manual steering. In some instances, however, the injury to the cylinder may be such as to form an obstruction to free reciprocation of the piston within the cylinder, and in this event it might be impossible to properly steer the vehicle manually. It is accordingly an object of the present invention to provide power steering mechanism in which the cylinder is protected against damage which might interfere with manual steering of the vehicle. It is a further object to attain this without materially adding to the cost of the unit, while at the same time simplifying the hydraulic connections necessary between the various parts of the system. In an embodiment of the invention this is accomplished by providing a second cylinder coaxially surrounding the main cylinder and spaced radially outwardly therefrom so as to provide an annular chamber between the two cylinders. This annular chamber is utilized as part of the hydraulic conduit system, and the other cylinder forms an additional protection for the cylinder in which the piston operates since, while damage to the outer cylinder may result in leakage which will render the hydraulic power unit inoperative, this damage ordinarily will not impair the reciprocation of the piston within the cylinder and consequently continued manual operation is insured.

A still further object of the invention is to provide, in power steering mechanism for a motor vehicle, a floating piston incorporating means for automatically providing communication between the cylinder on opposite sides of the piston during recovery strokes and automatically blocking this communication during power strokes. In an embodiment of the invention this feature takes the form of a piston mounted upon the inner end of the piston rod for relative sliding movement thereon between a pair of spaced stops. The piston is normally held centered between the stops by a pair of spring members, and the piston and piston rod are formed with cooperating passageways arranged to provide communication between the opposite ends of the cylinder when the piston is in its centered position. When, however, fluid pressure is applied to one end of or the other of the piston for power assisted steering operation, the resulting shifting of the piston relative to the piston rod results in closing the communication through the piston and in transmitting power therethrough to assist in steering the vehicle.

Other objects and advantages of this invention will be made more apparent as this description proceeds, particularly when considered in connection with the accompanying drawings, in which:

Figure 2 is an enlarged transverse cross-sectional view through the cylinder and piston assembly shown in Figure 1, with the parts shown in the relative locations they assume during straight ahead manual steering without power assistance.

Figure 3 is a cross-sectional view similar to Figure 2 but showing the parts in their relative positions during a full left turn under power assistance.

Figure 4 is a cross-sectional view similar to Figure 2 but showing the parts in their relative positions during a full right turn under power assistance.

Figure 1:
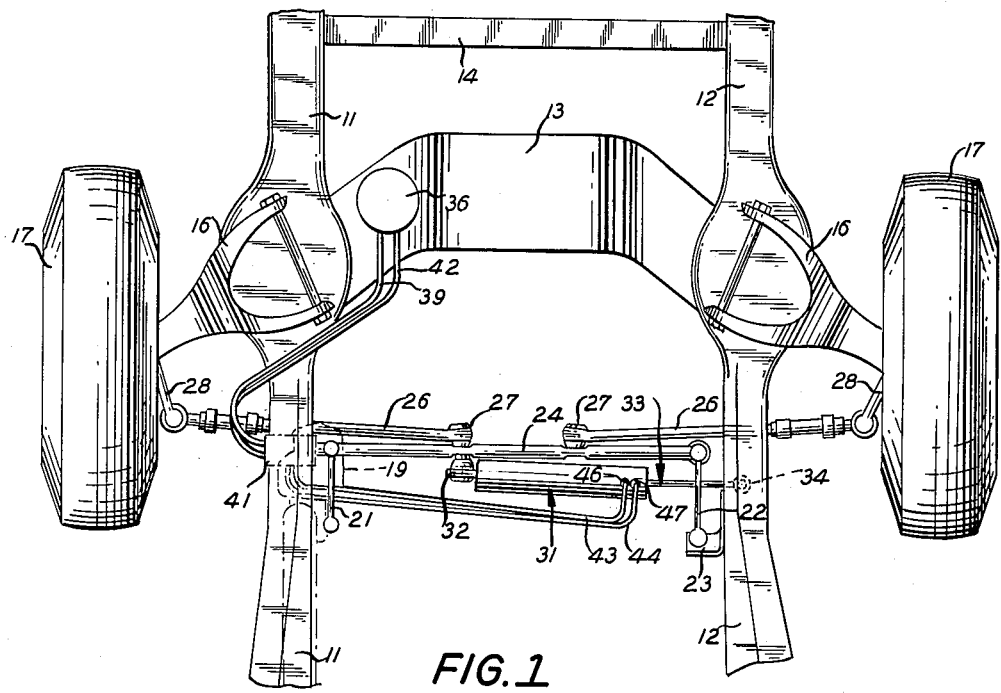
Figure 1 is a semi-diagrammatic plan view of the forward portion of a motor vehicle chassis incorporating the power steering mechanism of the present invention.

Referring now to the drawings, and particularly to Figure 1, the reference characters 11 and 12 indicate the side frame members of a motor vehicle chassis, joined by a main front cross member 13 and the auxiliary extreme front cross member 14. Conventional independent suspension means indicated generally by the reference character 16 support the front road wheels 17 for rising and falling movement relative to the frame.

The front road wheels 17 are mounted for turning movement about conventional king pins (not shown) and are controlled by conventional steering linkage and a manually operable steering gear. The steering gear assembly 19 is mounted upon the left side frame member 11 and actuates a pitman arm 21. Located generally symmetrically opposite the pitman arm 21 is an idler arm 22 pivotally connected at its rearward end to a bracket 23 carried by the right side frame member 12. A drag link 24 extends between the forward ends of the pitman arm 21 and the idler arm 22, being pivotally connected thereto. The inner ends of a pair of tie rods 26 are connected by means of ball joints 27 to laterally spaced intermediate points on the drag link 24. The outer ends of the tie rods 26 are pivotally connected to the rearward ends of the spindle arm 28 of the front road wheels 17. The construction thus far described is conventional and it utilized, with some variations in the linkage, in the majority of vehicles produced today.

To provide power assistance to the manual steering mechanism described above, there is provided power steering mechanism incorporating a cylinder assembly 31 to one end of which is secured an eye 32 pivotally connected to the rearward end of the connection 27 between the drag link 24 and the left hand tie rod 26. A piston rod 33 extends from the opposite end of the cylinder 31 and carries an eye 34 at its outer end which is pivotally connected to the right side frame member 12. If desired, rubber bushings (not shown) can be used to insulate the pivotal connection at the eyes 32 and 34.

Shown diagrammatically is a pump 36 of any desired conventional construction. The pressure side of the pump is connected by a conduit 39 to a valve mechanism 41, and a return conduit 42 leads from the valve to the sump of the pump. The valve 41 is likewise connected by conduits 43 and 44 to fittings 46 and 47 respectively mounted upon the cylinder 31. The valve mechanism 41 may be mounted separately from the cylinder 31 or, if desired, may be assembled within one end of the cylinder or carried thereby. It is actuated by a suitable signaling or sensing unit which forms no part of this invention and which may be of any conventional type. The sensing mechanism may, for example, actuate the valve 41 in response to movement between the end of the pitman arm and the drag link under steering load, by end movement of the steering column shaft, by torsion in the steering column shaft, by a climbing movement of a pair of gears associated with a steering column, or by any other suitable means. In any event, the valve mechanism 41 is operated to supply fluid under pressure to the cylinder 31 when the steering efforts are such as to require power assistance.

Referring now particularly to Figure 2, it will be seen that the cylinder assembly 31 comprises a pair of coaxial inner and outer cylinders 51 and 52 respectively. The outer cylinder 52 is sufficiently larger than the inner cylinder 51, in diameter, to provide an annular chamber 53 therebetween. The right hand ends of the inner and outer cylinders 51 and 52 are connected to an end cap 54 which is formed with an internal bore 56 through which the piston rod 33 may reciprocate. The left hand ends of the cylinders 51 and 52 are likewise closed and joined by means of an end cap 57, provided with a passageway 58 and ports 59 establishing communication between the annular chamber 53 and the interior of the inner cylinder 51. The eye 32 is welded to the end cap 57. The hydraulic fitting 46 establishes communication between the conduit 43 and the annular chamber 53 between the inner and outer cylinders 51 and 52. The hydraulic fitting 47 establishes communication between the conduit 44 and a passageway 62 formed in the end cap 54 and communicating with the right hand end of the cylinder 51.

The double cylinder construction thus forms an annular chamber functioning as a hydraulic passageway between the valve mechanism and one end of the inner cylinder, eliminating the need for an external conduit. In addition, the outer cylinder 52 forms a protection for the inner cylinder 51. Due to the exposed position of the cylinder assembly 31 adjacent the lower forward portion of the vehicle chassis, it is possible that damage may result thereto. Even though damaged to the extent of permitting the leakage of the hydraulic fluid from the annular chamber 53 between the inner and outer cylinders, the outer cylinder 52 forms a protection against structural damage to the inner cylinder 51. This may result in insuring continued operation of the manual steering mechanism in spite of loss of the power assistance, since distortion or other damage to a conventional single operating cylinder might interfere with the proper reciprocation of the piston therein and prevent proper operation of the manual steering mechanism.

Although the inner and outer cylinders 51 and 52 are shown as concentrically arranged, the two cylinders may be eccentric if desired, in which case the assembly is preferably positioned so that the maximum spacing between the cylinders is toward the road so as to afford the maximum protection to the inner cylinder.

The piston rod 33 comprises a body portion 63 of uniform diameter for sliding movement through the bore 56 of the end cap 54 of the cylinder. Near its end the piston rod is formed with a reduced portion 64 forming with the body portion 63 a shoulder against which a spring retainer 66 is seated. Toward the end of the piston rod from the reduced portion 64 is a second reduced portion 67 against which stop ring 68 is seated. The outer end 69 of the piston rod is reduced still further in diameter and is threaded to receive the hub of a second spring retainer 71. The hub of the spring retainer 71 also forms a stop cooperating with the stop 68 to limit the axial sliding movement of the piston 72 on the piston rod.

The piston 72 is provided on its outer periphery with a pair of spaced angular grooves within which are seated O ring seals 73 cooperating with the inner surface of the inner cylinder 51 to form seals therebetween. The inner bore 74 of the piston 72 slides freely on the reduced portion 67 of the piston rod between the stops formed by the members 68 and 71. A pair of coil springs 76 and 77 are provided on opposite sides of the piston 72, between the piston and the spring retainers 66 and 71. The piston 72 and spring retainers 66 and 71 are formed with annular grooves 78 within which are seated the ends of the coil springs. The coil springs are arranged to normally center the piston 72 between the stops 68 and 71.

Centrally between the stops 68 and 71 the reduced portion 67 of the piston rod is provided with an elongated annular groove 81. The inner bore of the piston 72 is formed with a pair of axially spaced angular grooves 82 and 83 spaced from each other a distance less than the axial dimension of the annular groove 81 in the piston rod so that in the central position of the piston as shown in Figure 2 the grooves 81, 82 and 83 are all in communication with each other.

Communication is provided between each of the annular grooves 82 and 83 in the piston and the cylinder at opposite sides of the piston by means of diagonally extending passageways. The passageway 84 extends diagonally from the annular groove 82 in the piston through the body portion of the piston to the right hand end thereof to provide communication between the right hand end of the cylinder and the annular groove 82. Similarly, a diagonal passageway 86 extends from the annular groove 83 through the body of the piston to the left hand end thereof to provide communication between the left hand end of the cylinder and the annular groove 83. If desired, a plurality of passageways similar to the passageways 84 and 86 respectively may be provided through the piston communicating between the ends of the piston and the annular grooves in the same manner as the passageways 84 and 86.

Figure 5:
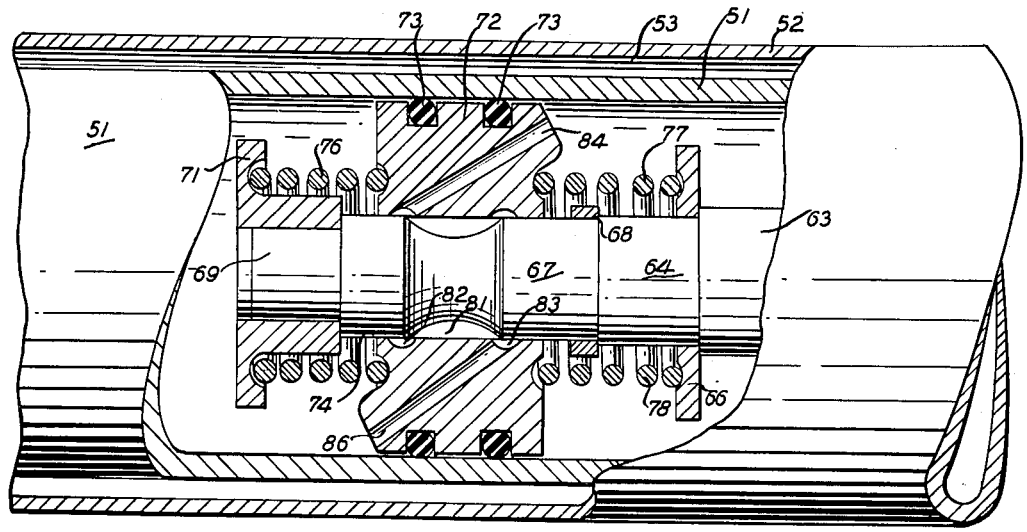
Figure 5 is an enlarged cross-sectional view similar to a portion of Figure 2.

It will be apparent that in the centered position of the piston 72 with respect to the stops 68 and 71 on the piston rod, as shown in Figures 2 and 5, open communication is provided between the opposite ends of the cylinder through the passageways and grooves 81, 82, 83, 84 and 86. This enables fluid to flow freely from one end of the cylinder to the other during the low pressure or recovery stroke of the piston. After a turn, the recovery steering movement to return the vehicle to straight ahead driving is readily accomplished since the necessary movement of the piston within the cylinder is permitted by the free flow of fluid through the piston from one end of the cylinder to the other. Similarly, manual steering effort, under conditions such that power assistance is not called for, can be readily accomplished since the springs 76 and 77 maintain the piston centered on the piston rod and communication through the piston between the opposite ends of the cylinder is automatically provided so as to accommodate the transfer of fluid from one end of the cylinder to the other. The displacement of the body portion 63 of the piston rod of course necessitates the flow of a certain amount of fluid through the exterior conduits 43 and 44 to the pump.

Reference is now made to Figure 3 illustrating the mechanism during a full left turn under power assistance. During a power assisted left turn, fluid under pressure from the pump 36 and the valve mechanism 41 is transmitted through the conduit 44, fitting 47 and passageway 62 to the right hand end of the inner cylinder 51. The initial effect of the pressure in the right hand end of the cylinder 51 is to shift the piston 72 to the left on the piston rod 33 against the action of coil spring 76. Stop 71 limits this relative axial movement. In this limiting position of the piston it will be noted that the annular groove 82 in the piston is no longer in communication with the elongated annular groove 81 in the piston rod and accordingly communication between the opposite ends of the cylinder through the piston is interrupted. Further application of pressure to the piston results in relative movement of the piston 72 toward the left hand end of the cylinder 51. Due to the fact that the piston rod 33 is anchored at its outer end to the frame member 12 the cylinder assembly 31 is actually shifted to the right relative to the vehicle chassis, resulting in a corresponding movement of the drag link 24 to which the left hand end of the cylinder 31 is clamped. The front road wheels 17 are consequently turned to the left by means of the steering connections above described.

At the completion of the power assisted turn the springs 76 and 77 again center the piston 72 between the stops 68 and 71 on the piston rod, automatically re-establishing communication between the opposite ends of the cylinder through the piston, and conditioning the mechanism for the recovery stroke.

Figure 4 illustrates the mechanism during a full right turn, and it will be noted that the application of pressure to the left end of the cylinder 51 from the pump 36 and valve mechanism 41 through the conduit 43, fitting 46, annular chamber 53 between the inner and outer cylinders, passageway 58 and ports 59 results in shifting the piston 72 relative to the piston rod 33 against the action of coil spring 77 until the piston seats against stop member 68. In this relative position of the piston and piston rod, it will be noted that the annular groove 83 in the piston no longer communicates with the elongated annular groove 81 in the piston rod. Consequently, communication through the piston between the opposite ends of the cylinder is interrupted and further application of fluid pressure to the left end of the cylinder results in relatively moving the piston toward the right hand end of the cylinder. This relative movement between the piston and cylinder, through the steering linkage, turns the front road wheels to the right.

It will be understood that the invention is not to be limited to the exact construction shown and described, but that various changes and modifications may be made without departing from the spirit and scope of the invention, as defined in the appended claims.

What is claimed is:

1. In a power steering device for a motor vehicle having a frame member, steerable road wheels and a manually operable steering gear mounted upon said frame member, and a movable steering linkage member between said steering gear and said road wheels to transmit manual steering effort to said road wheels, a cylinder having one end thereof connected to one of said members, a piston rod reciprocable within said cylinder and having one end extending beyond the opposite end of said cylinder and connected to the other of said members, a pair of axially spaced stops on the inner end of said piston rod, a piston slidably mounted upon said piston rod between said stops, spring means carried by said piston rod normally yieldably maintaining said piston at an intermediate position between said stops, said piston and piston rod having cooperating passages formed therein and interconnecting with each other in the said intermediate position of said piston to establish communication between opposite sides of said piston to permit the flow of fluid between opposite ends of said cylinder during manual steering and during the recovery from a power assisted steering movement, a source of fluid pressure, and means for selectively supplying said fluid pressure to one end of said cylinder to move said piston relative to said piston rod against the action of said spring means toward one of said stops to apply power steering effort to said piston rod, said passages being blocked when said piston is moved to a position adjacent one of said stops to close the communication through said piston between opposite ends of said cylinder.

2. The structure defined by claim 1 which is further characterized in that the cooperating passages in said piston and said piston rod comprise an annular groove formed in said piston rod between said stops, a passageway in said piston extending from one side of said piston to the bore of said piston, a second passageway in said piston extending from the opposite side of said piston to the bore of said piston, said passageways communicating with the bore of said piston at axially spaced points arranged so that both passageways communicate with the annular groove in said piston rod when the piston is held by said spring means in its intermediate position between said stops, only one of said passageways in said piston communicating with the annular groove in said piston rod when the piston has been moved against one of the stops on the piston rod by the fluid pressure supplied to one end of said cylinder.

3. A power steering device for a motor vehicle comprising a cylinder, a piston rod reciprocable relative to said cylinder, a piston reciprocable within said cylinder and slidably mounted upon the inner end of said piston rod, a pair of axially spaced stops on the inner end of said piston rod limiting the sliding movement of said piston on said piston rod in both directions, spring retainers carried by said piston rod on opposite sides of said piston, coil springs encircling said piston rod between said spring retainers and the opposite sides of said piston and normally centering said piston between said stops, a passageway in said piston rod intermediate said stops, a passageway in said piston establishing communication between the cylinder on one side of said piston and the passageway in said piston rod when the piston is in its centered position and a second passageway in said piston establishing communication between the cylinder on the opposite side of said piston and the passageway in said piston rod when the piston is in its centered position to establish communication between the ends of said cylinder on opposite sides of said piston, a source of fluid pressure, and means for supplying fluid pressure from said source to one end of said cylinder to shift said piston relative to said piston rod against the action of one of said springs and toward one of said stops to break communication between one of the passageways in said piston and the passageway in said piston rod to interrupt the communication between the opposite ends of said cylinder through said piston so that the fluid pressure from said source will be effective to apply power steering effort to said cylinder and piston assembly.

4. The structure defined by claim 3 which is further characterized in that the passageway in said piston rod comprises an annular groove formed centrally between said stops, and the passageways in said piston each extend from one side of said piston diagonally inwardly to the bore of said piston intersecting the latter at points spaced axially from each other a distance less than the axial dimension of the annular groove in said piston rod so that both passageways communicate with said annular groove in the centered position of said piston but only one of said passageways communicates with said annular groove when said piston has been shifted axially of said piston rod against one of said stops.

5. A power steering device for a motor vehicle comprising a cylinder, a piston rod reciprocable within said cylinder, a pair of axially spaced stops on said piston rod, a piston slidably mounted upon said piston rod between said stops, spring means carried by said piston rod yieldably maintaining said piston at an intermediate position between said stops, said piston and said piston rod having co-operating passages formed therein and interconnecting with each other in said intermediate position of said piston to establish communication between opposite sides of said piston to permit the flow of fluid between opposite ends of said cylinder, a source of fluid pressure, and means for selectively supplying said fluid pressure to one end of said cylinder to move said piston relative to said piston rod against the action of said spring means toward one of said stops to apply power steering effort to said piston rod, said passages being blocked when the piston is moved to a position adjacent one of said stops to close the communication through said piston between opposite ends of said cylinder.

References Cited in the file of this patent

UNITED STATES PATENTS

| | | |
|---|---|---|
| 1,994,835 | Sanford et al. | Mar. 19, 1935 |
| 2,274,519 | Barrett | Feb. 24, 1942 |
| 2,340,817 | Hurst | Feb. 1, 1944 |

FOREIGN PATENTS

| | | |
|---|---|---|
| 654,269 | Great Britain | June 13, 1951 |